US012305520B2

(12) United States Patent
Gharagozloo et al.

(10) Patent No.: US 12,305,520 B2
(45) Date of Patent: May 20, 2025

(54) METHOD OF MITIGATING CORROSION AND EROSION IN AN AIRCRAFT ENGINE

(71) Applicant: PRATT & WHITNEY CANADA CORP., Longueuil (CA)

(72) Inventors: Alireza Gharagozloo, Boucherville (CA); Roja Tabar, Boucherville (CA); Pascal Lavoie, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 70 days.

(21) Appl. No.: 18/045,658

(22) Filed: Oct. 11, 2022

(65) Prior Publication Data

US 2024/0117755 A1 Apr. 11, 2024

(51) Int. Cl.

*F01D 25/00* (2006.01)
*F01D 25/24* (2006.01)
*F01D 25/32* (2006.01)

(52) U.S. Cl.

CPC ........... *F01D 25/007* (2013.01); *F01D 25/24* (2013.01); *F01D 25/32* (2013.01); *F01D 25/002* (2013.01); *F05D 2260/95* (2013.01); *F05D 2270/11* (2013.01)

(58) Field of Classification Search

CPC ........ F01D 25/007; F01D 25/24; F01D 25/32; F01D 25/002; F05D 2260/95; F05D 2270/11

See application file for complete search history.

(56) References Cited

U.S. PATENT DOCUMENTS

| | | | | |
|---|---|---|---|---|
| 7,871,237 | B2 | 1/2011 | Bunce et al. | |
| 8,204,671 | B2 * | 6/2012 | Agrawal | G01M 15/14 701/100 |
| 10,906,670 | B2 | 2/2021 | Sachdeva et al. | |
| 11,268,449 | B2 | 3/2022 | Escriche et al. | |
| 2010/0102835 | A1 * | 4/2010 | Chillar | F01D 25/002 324/700 |
| 2018/0001048 | A1 | 1/2018 | Dauenhauer et al. | |
| 2018/0073389 | A1 | 3/2018 | Zhang et al. | |
| 2018/0245477 | A1 * | 8/2018 | Kulkarni | B08B 3/02 |
| 2019/0003954 | A1 * | 1/2019 | Detor | G01N 17/04 |
| 2020/0131996 | A1 * | 4/2020 | Hanlon | F04D 27/001 |

OTHER PUBLICATIONS

European Search Report issued in counterpart EP application No. 23201931.5 on May 23, 2024.

* cited by examiner

*Primary Examiner* — Topaz L. Elliott
*Assistant Examiner* — Andrew J Marien
(74) *Attorney, Agent, or Firm* — NORTON ROSE FULBRIGHT CANADA LLP

(57) ABSTRACT

A method of mitigating corrosion and erosion in an aircraft engine, includes: receiving a concentration of contaminants contained within a sample of an environmental medium ingested by the aircraft engine; determining a frequency of corrosion and erosion mitigation actions based on the concentration of the contaminants; and instructing a performance of the corrosion and erosion mitigation actions at the frequency.

20 Claims, 5 Drawing Sheets

METHOD OF MITIGATING CORROSION AND EROSION IN AN AIRCRAFT ENGINE

TECHNICAL FIELD

The application relates generally to aircraft engines and, more particularly, to systems and methods used to schedule corrosion and erosion mitigation actions of such engines.

BACKGROUND OF THE ART

Aircraft engines may fly through a wide variety of conditions, such as rain, snow, sand, and so on. Engine components may be subjected to erosion and corrosion over time. Erosion may be the result of insoluble particles, such as dust and sand, flowing through the engine whereas corrosion may be the result of soluble particles such as salt. Each engine is to be subjected to corrosion and erosion mitigation actions, such as engine washing, inspection of components, replacement of parts, and so on at a predetermined frequency. However, depending on the environment the aircraft engine is flying through, this predetermined frequency may be optimized.

SUMMARY

In one aspect, there is provided a method of mitigating corrosion and erosion in an aircraft engine, comprising: receiving a concentration of contaminants contained within a sample of an environmental medium ingested by the aircraft engine; determining a frequency of corrosion and erosion mitigation actions based on the concentration of the contaminants; and instructing a performance of the corrosion and erosion mitigation actions at the frequency.

The method described above may include any of the following features, in any combinations.

In some embodiments, the receiving of the concentration of the contaminants includes receiving results of an analysis of the sample from a volume of the environmental medium collected after a given period of time of operation of the aircraft engine.

In some embodiments, the analysis comprises one or more of a spectroscopy analysis of the sample, a deposit analysis of the sample, and an exposition of the sample to strips configured to change color when a concentration of a given contaminants is about a given threshold.

In some embodiments, the receiving of the concentration of the contaminants includes receiving a concentration of soluble particles causing corrosion.

In some embodiments, the receiving of the concentration of the contaminants includes receiving a concentration of insoluble particles causing erosion.

In some embodiments, the receiving of the concentration of the contaminants includes receiving a concentration of one or more of chloride, saline, sulphone, sand, and dust.

In some embodiments, the determining of the frequency of the corrosion and erosion mitigation actions based on the concentration of the contaminants includes determining that the frequency of the corrosion and erosion mitigation actions is decreased compared to a baseline frequency of the corrosion and erosion mitigation actions.

In some embodiments, the determining of the frequency of the corrosion and erosion mitigation actions based on the concentration of the contaminants includes determining that the frequency of the corrosion and erosion mitigation actions is increased compared to a baseline frequency of the corrosion and erosion mitigation actions.

In some embodiments, the instructing of the performance of the corrosion and erosion mitigation actions at the frequency includes instructing the performance of one or more of an inspection, replacement of one or more components of the aircraft engine, and engine wash.

In some embodiments, the receiving of the concentration of the contaminants includes receiving the concentration of the contaminants contained within a container containing the sample, the container fluidly connectable to a drain port of the aircraft engine.

In some embodiments, the method further comprises determining an exposure time of the aircraft engine to the environmental medium containing the contaminants.

In some embodiments, the determining of the exposure time includes determining the exposure time as a function of a volume of the environmental medium within a container connectable to a drain port of the aircraft engine and of a flow rate of the environmental medium at which the environmental medium flows into the container.

In another aspect, there is provided a method of mitigating corrosion and erosion in an aircraft engine, comprising: performing corrosion and erosion mitigation actions at a baseline frequency; receiving information indicative that the baseline frequency has to be modified to a modified frequency based on a concentration of contaminants contained within a sample of an environmental medium ingested by the aircraft engine; and performing the corrosion and erosion mitigation actions at the modified frequency.

The method described above may include any of the following features, in any combinations.

In some embodiments, the receiving of the information indicative that the baseline frequency has to be modified includes receiving a concentration of the contaminants from an analysis of the sample from a volume of the environmental medium collected after a period of time of operation of the aircraft engine.

In some embodiments, the analysis comprises one or more of a spectroscopy analysis of the sample, a deposit analysis of the sample, and an exposition of the sample to strips configured to change color when a concentration of a given contaminants is about a given threshold.

In some embodiments, the receiving of the information indicative that the baseline frequency has to be modified includes receiving a concentration of soluble particles causing corrosion.

In some embodiments, the receiving of the information indicative that the baseline frequency has to be modified includes receiving a concentration of insoluble particles causing erosion.

In some embodiments, the receiving of the information indicative that the baseline frequency has to be modified includes receiving a concentration of one or more of chloride, saline, sulphone, sand, and dust.

In some embodiments, the performing of the corrosion and erosion mitigation actions includes performing one or more of an inspection, replacement of one or more components of the aircraft engine, and engine wash.

In some embodiments, the receiving of the information indicative that the baseline frequency has to be modified includes receiving the concentration of the contaminants contained within a container containing the sample, the container fluidly connectable to a drain port of the aircraft engine.

DESCRIPTION OF THE DRAWINGS

Reference is now made to the accompanying figures in which.

DETAILED DESCRIPTION

Figure 1:
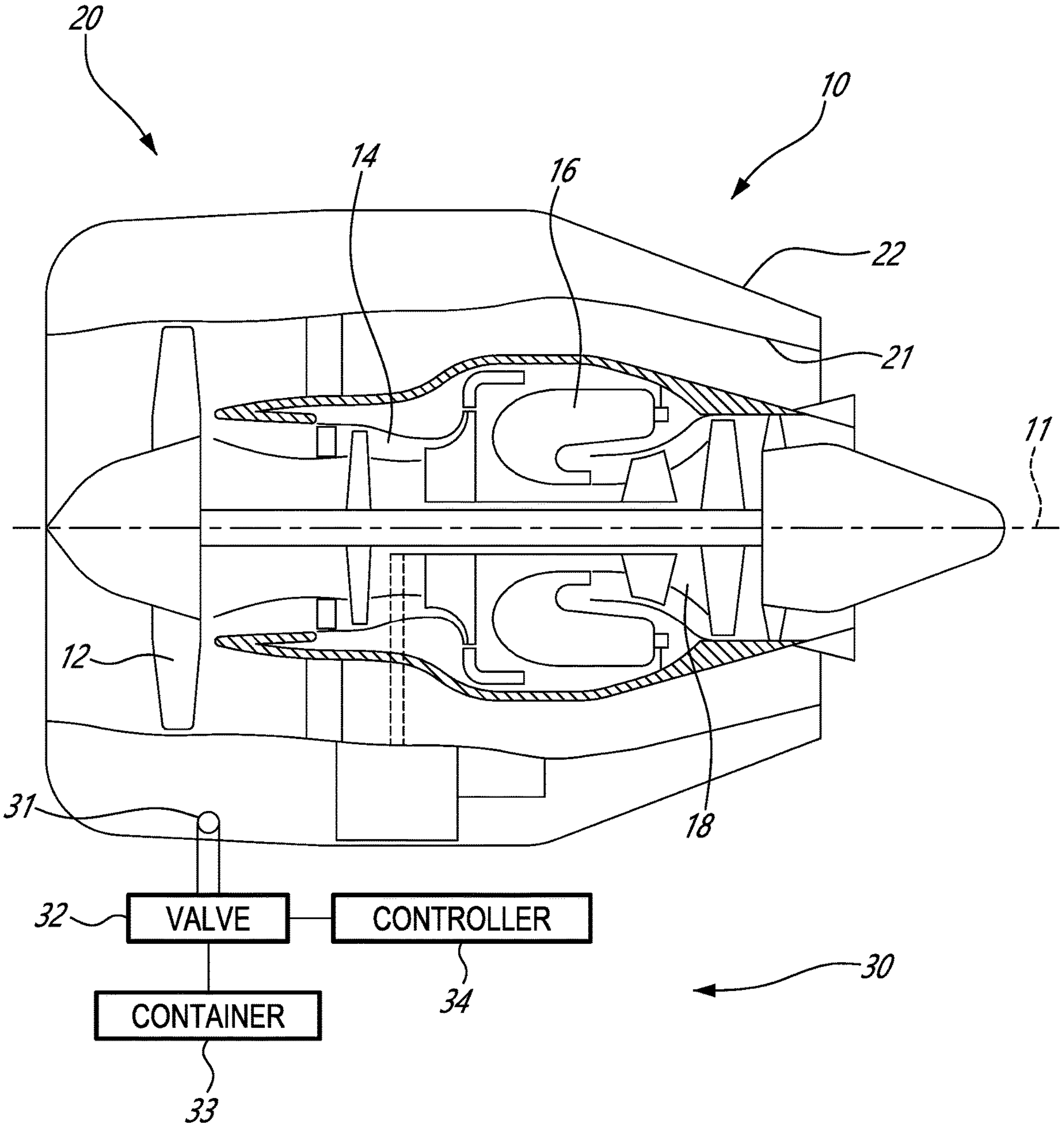
FIG. 1 is a schematic cross sectional view of an aircraft engine depicted as a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Although illustrated as a turbofan engine, the gas turbine engine 10 may alternatively be another type of engine, for example a turboshaft engine or a turboprop engine. In addition, although the engine 10 is described herein for flight applications, it should be understood that other uses, such as industrial or the like, may apply.

The gas turbine engine 10 includes a nacelle 20. A medium collection system 30 is located within the nacelle 20. The medium collection system 30 may be located between inner and outer cases 21, 22 of the nacelle 20. The medium collection system 30 includes a drain port 31 that may be located at a lower elevation on the gas turbine engine 10. The drain port 31 may be fluidly connected to other components of the gas turbine engine to drain water flowing through the gas turbine engine 10 during a flight. For instance, water entering the compressor section 14 may be drained out of the compressor section 14 via suitable conduits and reach the drain port 31. The drain port 31 may be fluidly connected to a valve 32, which is itself connected to a container 33. In other words, the drain port 31 may be fluidly connected to the container 33 through the valve 32. The valve 32 may have a closed configuration in which fluid communication between the drain port 31 and the container 33 is blocked and one or more open configurations as will be described below. The valve 32 may be operatively connected to a controller 34 to control opening and closing of the valve 32. The valve 32 may be a servo valve or connected to an actuator to control the opening and closing of the valve 32. Although not shown, a bypass conduit may be connected to the drain port 31 to evacuate extra ingested medium (e.g., environmental water) when the container 33 is full. According to some embodiments, the container 33 is located within the nacelle 20 between the inner and outer cases 21, 22. However, it is understood that the container 33 can be located at any other suitable locations.

One of the key factors for the integrity of metal components of the gas turbine engine 10 during their operating life cycle is the environment in where they operate. Failure modes such as corrosion and erosion may occur when a component operates in an environment which contains chemical substances and erosive particles. For example, operating in an environment with chloride, saline, sulphone, sand, dust, etc. may increase the risk of corrosion and erosion. Existence of such substances in addition to pH level, the amount of water, and high temperature operating condition may result in corrosion (or sulfidation) or erosion.

To address the effects of corrosion and erosion on engine components, there are maintenance and preventive design considerations. Aircraft engines may be subjected to corrosion and erosion mitigation actions to alleviate effects of the environment in which the engines are flying. For instance, frequent inspections, scheduled replacements, and/or engine washes are possible solutions. As engines are used globally, they are exposed to different environments, and their operating environment may constantly change during their life cycle. Therefore, the mitigation actions for preventing these failure modes may need to be planned with regards to all those environmental conditions. Therefore, these mitigation actions may be too conservative causing extra cost, or too optimistic and may impact the reliability of an engine if they are defined the same for all engines in an fleet.

The present disclosure proposes a method to monitor the operating environment condition in terms of an environmental medium ingested by an engine while in operation. This environmental medium typically includes a volume of air within which the aircraft engine is operated. This mass of air may include water, either in liquid form when it is raining or in gaseous form as part of a humidity content of the air, and contaminants such as soluble particles and insoluble particles. The soluble particles may include, for instance, chloride, saline, sulphone. The insoluble particles may include, for instance, sand and dust. When the aircraft engine is in operation, it ingests this environmental medium. Consequently, the different particles flow through the aircraft engine. In rainy conditions, water may also be ingested by the aircraft engine. This water may itself contain some contaminants and/or may entrain some contaminants already present within the aircraft engine and/or in suspension in the air. The environmental water flowing through the aircraft engine may thus see its contaminant content increase as it meets the different components of the aircraft engine. Moreover, a high relative humidity may result in water condensation on the different components of the aircraft engine. This water, which is initially in gaseous form, may condensate as it contacts a component of the aircraft engine and continues to flow through the aircraft engine in a liquid form. In so doing, this condensed water may pick up contaminants from the different components of the aircraft engine and/or from contaminants in suspension in the air.

Typically, aircraft engines have a drain port to evacuate such water either from rain or from condensation. As recited above, this water may contain some contaminants. The medium collection system 30 may be used to retrieve some of this water, which includes the contaminants, while the aircraft engine is in operation. As explained above, this water may contain some contaminants either in soluble or insoluble form. The valve 32 may be used to adjust a flow rate at which this water and contaminants enter into the container 33. Adjusting the valve 32 to a certain flow rate may give a mean to calculate the time the engine was exposed to a specific environment condition. By having the adjusted flow rate and the accumulated water volume in the container 33, the exposure time may be determined. The container 33 therefore contains a sample of this environmental medium ingested by the aircraft engine while in operation. The container 33 may be removable and/or replaceable. The container 33 may be sent to a lab for further analysis.

Predefined thresholds for amount of water entering the engine, chemical contents (sulfuric and chloric combinations), Ph level, exposure time, salt, particles (e.g., sand, dust), etc. may be determined. For example, for each engine model there may be a table of limits for each items listed above. If it is determined that one or more of these limits are surpassed, one or more corrosion and erosion mitigation action(s) may be performed. For instance, it may be determined that the salt concentration is above a given threshold at which one or more components may be prone to corrosion. The corrosion and erosion mitigation action for this one or more components may be undertaken. The corrosion and erosion mitigation actions may include, for instance, maintenance actions such as inspection of the component(s), replacement of the component(s), the engine wash, or any other preventative measures. The trend of amount of this environmental medium entering the aircraft engine while in operation, which may include water, chemical contents (sulfuric and chloric combinations), Ph level, exposure time, salt, particles (e.g., sand, dust), etc., may be monitored to trigger any required preventive actions.

These thresholds may be determined by recording, over a given period of time (e.g., given number of hours of flights, given number of flights, etc.), the concentration of the different contaminants from samples that are periodically collected, and number of instances of corrosion and erosion events observed. For instance, these thresholds may be determined via a learning phase of that specific aircraft engine. The aircraft engine may be used as part of its normal operation and samples of the environmental medium may be collected periodically (e.g., given number of hours of flights, given number of flights, etc.). The corrosion and erosion mitigation actions may be performed as prescribed at a nominal frequency, which may be the same for all of the aircraft engines of a given kind (e.g., part number). During this learning phase, instances of corrosion and erosion events may be recorded and associated with the concentrations of the contaminants present in the samples collected. It may therefore be possible to associate concentration thresholds of certain contaminants with specific corrosion and erosion events. As an example, an inspection may be performed as scheduled at the nominal frequency and may reveal that corrosion of a given component is beyond an acceptable level for the number of hours it has been used. Then, the premature wear of this component via corrosion may be associated with a given concentration of salt in the samples collected. It may then be determined that earlier replacement of this component is required if a salt concentration in the collected samples is above or at this given concentration. These data may be consolidated from all engines of a fleet and shared therebetween.

These samples of the environmental medium ingested by the aircraft engine while in operation may be collected at a given frequency (e.g., after each 100 hours of operation) that may be greater than an estimated frequency of replacement of a component subjected to corrosion and/or erosion (e.g., after each 1000 hours of operation). Put differently, a component may be expected to be replaced after a given number of hours of operation before exhibiting corrosion and/or erosion under the worst conditions possible. The collecting of the samples should be performed more frequently than the frequency of replacement of this component. For example, if the component is expected to last 1000 hours during operation under the most critical conditions for corrosion and/or erosion, the samples should be collected at each "X" number of hours, where "X" is smaller than 1000. This may ensure that the component does not experience a corrosion or erosion event before the first sample is even collected.

The samples collected may then be analyzed using any suitable techniques to determine, for instance, their chemical contents (e.g., sulfuric and chloric combinations), Ph level, sand content, other particles content (e.g., dust), exposure time from the volume of the samples, and so on. The analysis may include, for instance, a spectroscopy analysis of the sample, a deposit analysis of the sample, exposing the sample to strips configured to change color when a concentration of a given contaminants is about a given threshold, and so on. These analysis may be performed off-site, such as in a lab.

Therefore, each engine may have its own record of the environment condition in which it has been operating. Then, by comparing those records with the thresholds defined by analysis and the trend of the data, the future maintenance actions may be taken to prevent corrosion or erosion on that engine. This may enhance the reliability of the engine compartments in the service.

Figure 2:
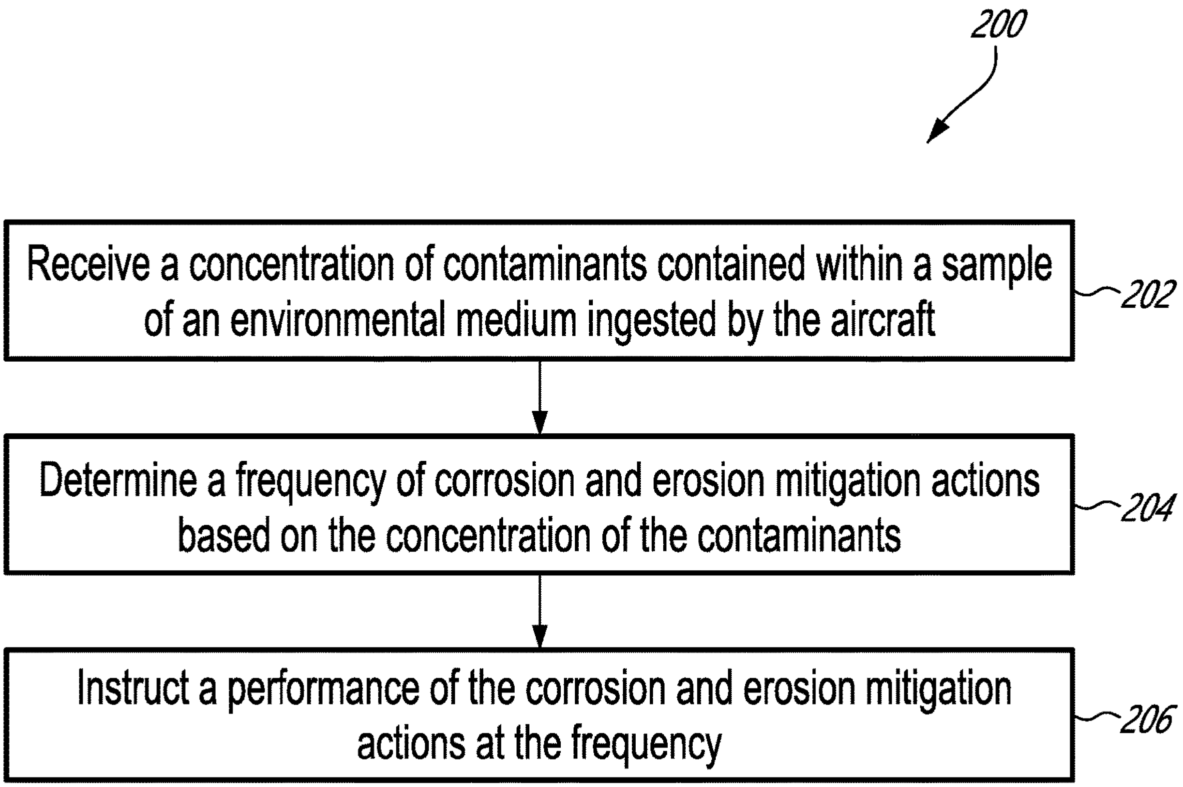
FIG. 2 is a flowchart illustrating steps of a method for mitigating corrosion and erosion in the aircraft engine of FIG. 1 in accordance with one embodiment.

Referring to FIG. 2, a method is shown at 200. The method 200 includes receiving a concentration of contaminants contained within a sample of an environmental medium ingested by the aircraft at 202; determining a frequency of corrosion and erosion mitigation actions based on the concentration of the contaminants at 204; and instructing a performance of the corrosion and erosion mitigation actions at the frequency at 206. The step 206 may include scheduling the corrosion and erosion mitigation actions at the frequency. The step 206 may include performing the corrosion and erosion mitigation actions at the frequency.

It will be appreciated that the environmental medium ingested by the engine while the engine is in operation may be collected and stocked for subsequent periodic analysis. A sample of the collected medium may then be sent out for further processing and analysis to a lab. Therefore, according to some embodiments, the step of determining the concentration of the contaminants is performed on the ground.

According to some embodiments, the determining of the frequency of the corrosion and erosion mitigation actions at 204 may include receiving results of an analysis of the sample from a volume of the environmental medium collected after a given period of time of operation (e.g., number of flights, hours of operation) of the aircraft engine. The analysis may include one or more of a spectroscopy analysis of the sample, a deposit analysis of the sample, and an exposition of the sample to strips configured to change color when a concentration of a given contaminants is about a given threshold.

The receiving of the concentration of contaminants at 202 may include receiving the concentration of the contaminants contained within the container 33; the container 33 being fluidly connectable to the drain port 31 of the aircraft engine 10. The determining of the concentration of the contaminants may include determining the concentration of the contaminants within the environmental medium contained in the container 33. The method 200 may include determining an exposure time of the aircraft engine 10 to the environmental medium containing the contaminants.

The receiving of the concentration of contaminants at 202 may include collecting the medium by flowing the medium from the drain port 31 of the aircraft engine to the container 33. The receiving of the concentration of the contaminants at 202 may include determining the concentration of the contaminants within the sample contained in the container 33. In the embodiment shown, the flowing of the medium from the drain port 31 to the container 33 may include: flowing the medium from the drain port 31 to the container 33 through the valve 32; adjusting a position of the valve 32 such that the medium flows through the valve 32 at a given flow rate; and determining an exposure time of the aircraft engine to the medium based on a volume of the medium contained within the container 33 and the given flow rate.

The determining of the exposure time may include determining the exposure time as a function of a volume of the environmental medium within the container 33 connectable to the drain port 31 and of a flow rate of the environmental medium at which the environmental medium flows into the container 33. To do so, the valve 32, which may be a servo valve or any other kind of valve coupled to an actuator, may be operatively connected to the controller 34. The controller 34 may be operable to determine a suitable configuration or position of the valve 32 such that a given flow rate of the medium through the valve 32 is known. The controller 34 may be operatively connected to sensors operable to send signal(s) to the controller 34; the signal(s) indicative of the flow rate through the valve 32 and of a level of the medium within the container 33. The controller 34 may reduce a size of an opening of the valve 32 to maximize the time required for filling the container 33. In an alternate embodiment, the valve 32 may be configured to a pre-set flow rate for each engine based on the amount of rain the engine will be exposed to. In some embodiments, a signal may be sent from a floating sensor located within the container 33. The floating sensor may send a signal to the controller 34, which may in turn adjust a position of the valve to control the flow rate through the valve 32. The flow rate may decrease as the container 33 accumulates the medium. The flow rate may decrease gradually as the container 33 is being filled to prevent the container 33 from overflowing. The controller 34 may be configured to calculate a time as a function of the valve position and the volume of the medium accumulated in the container 33, and may consequently adjust a position of the valve.

According to some embodiments, the determining of the concentration of the contaminants includes determining a concentration of soluble particles causing corrosion. It may also include determining a concentration of insoluble particles causing erosion. It may include determining concentration of one or more of chloride, saline, sulphone, sand, and dust.

The determining of the frequency of the corrosion and erosion mitigation actions at based on the concentration of the contaminants at 204 may include determining that the frequency of the corrosion and erosion mitigation actions is decreased compared to a baseline frequency of the corrosion and erosion mitigation actions. Alternatively, the determining of the frequency of the corrosion and erosion mitigation actions based on the concentration of the contaminants at 204 may include determining that the frequency of the corrosion and erosion mitigation actions is increased compared to a baseline frequency of the corrosion and erosion mitigation actions.

The scheduling of the corrosion and erosion mitigation actions at the frequency at 206 may include scheduling one or more of an inspection (e.g., baroscopic inspection), replacement of one or more components (e.g., blades operating in hotter section of the aircraft engine) of the aircraft engine, and engine wash.

The receiving of the concentration of contaminants at 202 may include receiving the sample collected in the container 33 fluidly connectable to the drain port 31 of the aircraft engine 10. The receiving of the concentration of the contaminants may include determining the concentration of the contaminants within the environmental medium contained in the container 33. The method 200 may include determining an exposure time of the aircraft engine 10 to the environmental medium containing the contaminants.

Figure 3:
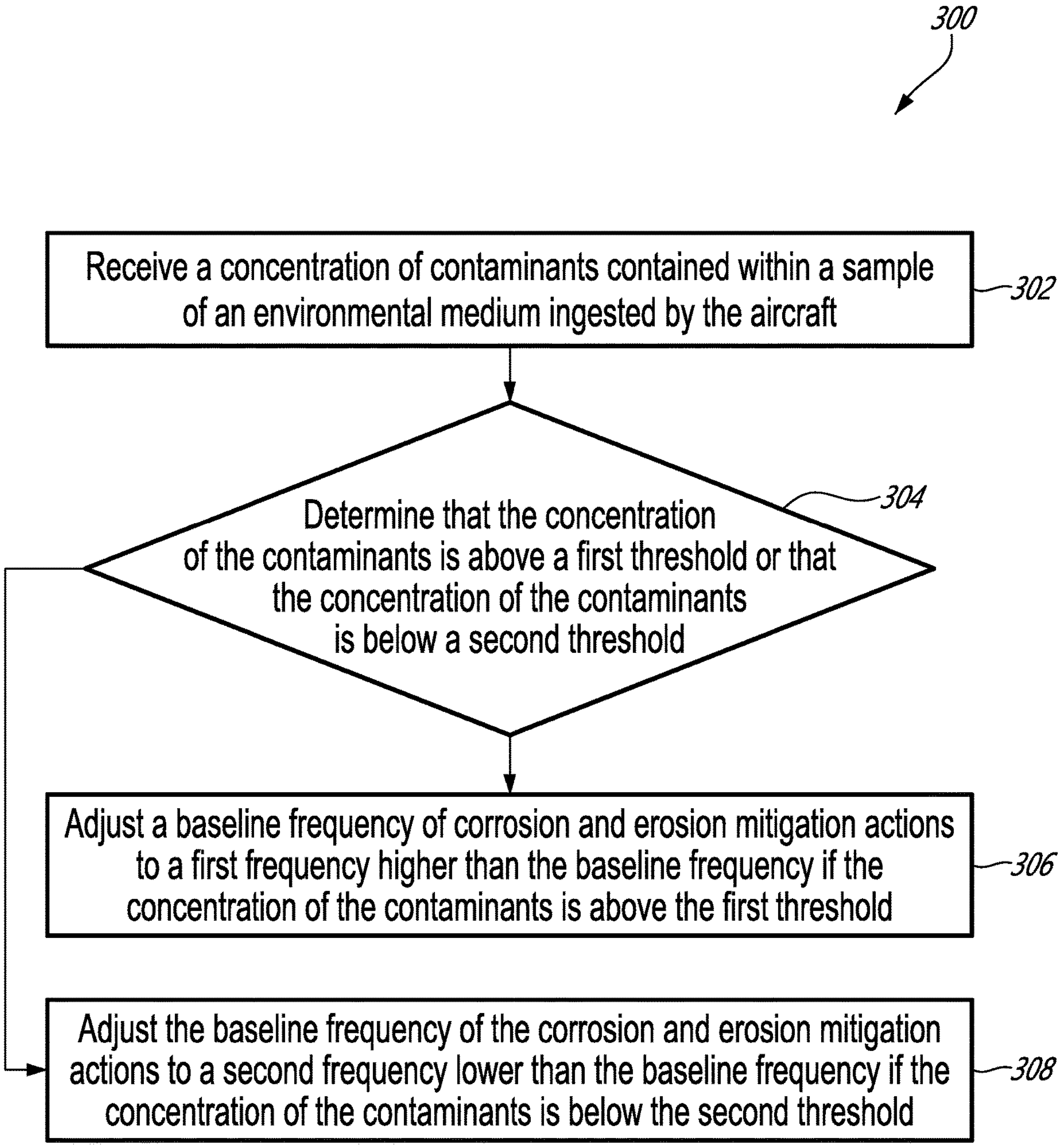
FIG. 3 is a flowchart illustrating steps of another method for mitigating corrosion and erosion in the aircraft engine of FIG. 1 in accordance with another embodiment.

Referring now to FIG. 3, another method is shown at 300. The method 300 includes receiving a concentration of contaminants contained within a sample of an environmental medium ingested by the aircraft at 302; determining that the concentration of the contaminants is above a first threshold or that the concentration of the contaminants is below a second threshold at 304. The first threshold may be greater than or equal to the second threshold. Then, if the concentration of the contaminants is above the first threshold, a baseline frequency of corrosion and erosion mitigations action is adjusted to a first frequency higher than the baseline frequency at 306. Alternatively, if the concentration of the contaminants is below the second threshold, the baseline frequency of corrosion and erosion mitigation actions is adjusted to a second frequency lower than the baseline frequency at 308.

Again, it will be appreciated that the medium ingested by the engine may be collected, such as in a container, for subsequent analysis. Once on ground, a sample of the collected medium may be sent out to a lab for further processing and analysis. Therefore, the step of determining the concentration of the contaminants is performed on the ground.

Based on erosion or corrosion test the first thresholds may be determined and the scheduled mitigation actions may be proposed for each engine family. This test may be done in the lab on simulated environment representative of the average or the worst environment conditions to which engines will be exposed. This threshold may be optimistic or pessimistic which may lead to unwanted erosion and corrosion in the field, or it may lead to higher cost of mitigation action when the scheduled mitigation action is sooner than it should be.

After operating with these thresholds, the trend of the sand, dust, salt, chemical content level of the accumulated water may be monitored for each engine serial number and adjust the thresholds and mitigation actions based on the field experience (e.g., the number of corrosion and erosion events observed).

The engine data, such as the temperature in which the component operates, may be used as another parameter to adjust the second threshold.

In the embodiment shown, the determining of the concentration of contaminants at 302 includes analyzing the sample after a period of time of operation (e.g., number of flights, hours of operation, etc.) of the aircraft engine. The analyzing of the sample includes performing one or more of a spectroscopy analysis of the sample, a deposit analysis of the sample, exposing the sample to strips configured to change color when a concentration of a given contaminants is about a given threshold.

The receiving of the concentration of the contaminants at 302 may include receiving the concentration of the contaminants contained within the container 33 containing the sample; the container 33 being fluidly connectable to the drain port 31. As described above, the method 300 may include flowing the medium from the drain port 32 to the container 33 through the valve 32; adjusting a position of the valve such that the medium flows through the valve 32 at a given flow rate; and determining an exposure time of the aircraft engine to the medium based on a volume of the medium contained within the container 33 and the given flow rate.

The receiving of the concentration of the contaminants at 302 may include receiving a concentration of soluble particles causing corrosion within the sample. The receiving of the concentration of the contaminants at 302 may include receiving a concentration of insoluble particles causing erosion within the sample. The receiving of the concentration of the contaminants at 302 may include receiving a concentration of one or more of chloride, saline, sulphone, sand, and dust.

The scheduling of the corrosion and erosion mitigation actions at the first frequency or at the second frequency at 310 may include scheduling one or more of an inspection, replacement of one or more components of the aircraft engine, and engine wash, or any other suitable mitigation action.

Figure 4:
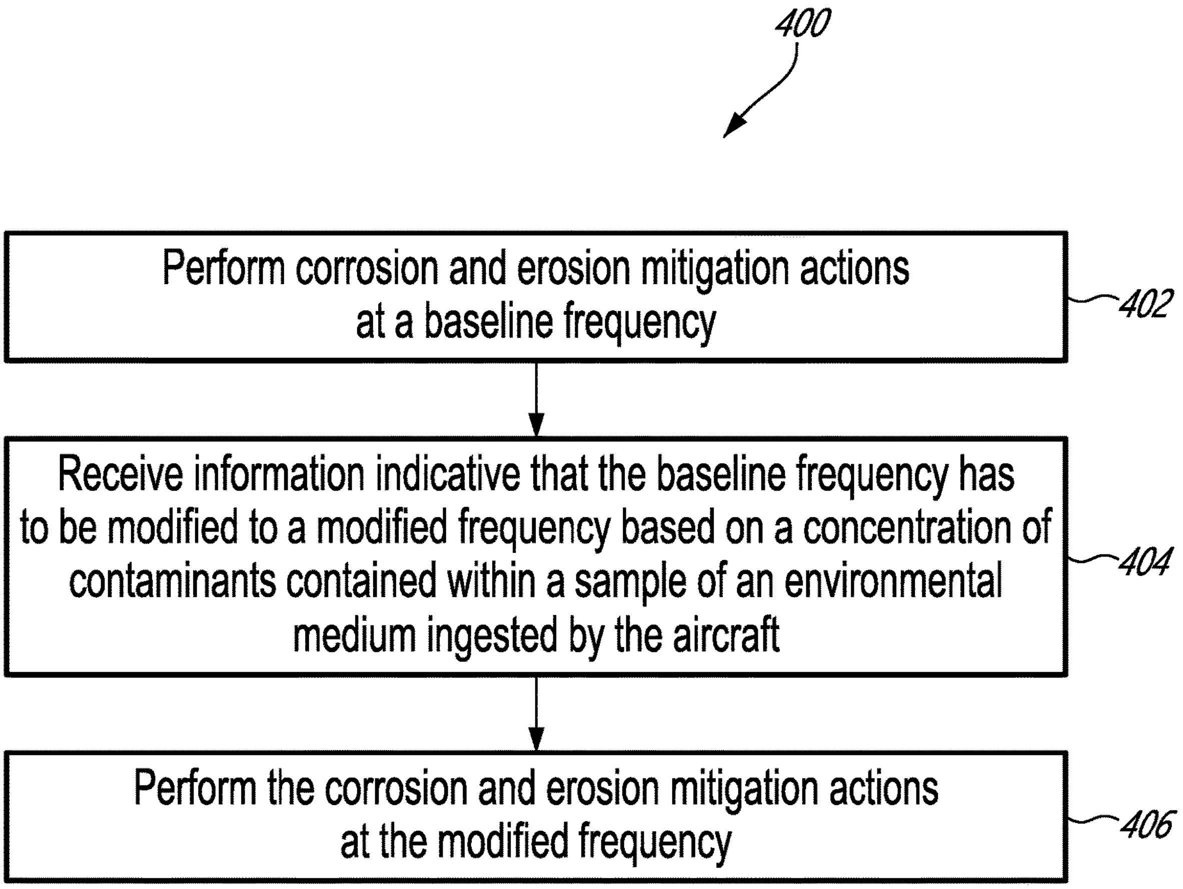
FIG. 4 is a flowchart illustrating steps of yet another method for mitigating corrosion and erosion in the aircraft engine of FIG. 1 in accordance with yet another embodiment.

Referring now to FIG. 4, another method of mitigating corrosion and erosion in an aircraft engine is shown at 400. The method 400 includes performing corrosion and erosion mitigation actions at a baseline frequency at 402; receiving information indicative that the baseline frequency has to be modified to a modified frequency based on a concentration of contaminants contained within a sample of an environmental medium ingested by the aircraft at 404; and performing the corrosion and erosion mitigation actions at the modified frequency at 406.

In the embodiment shown, the receiving of the information indicative that the baseline frequency has to be modified at 404 includes receiving a concentration of the contaminants from an analysis of the sample from a volume of the environmental medium collected after a period of time of operation of the aircraft engine. The analysis may include one or more of a spectroscopy analysis of the sample, a deposit analysis of the sample, and an exposition of the sample to strips configured to change color when a concentration of a given contaminants is about a given threshold. The receiving of the information indicative that the baseline frequency has to be modified at 404 may include receiving the concentration of the contaminants contained within a container containing the sample, the container fluidly connectable to a drain port of the aircraft engine.

In the embodiment shown, the receiving of the information indicative that the baseline frequency has to be modified at 404 includes receiving a concentration of soluble particles causing corrosion within the sample. It may include receiving a concentration of insoluble particles causing erosion within the sample. It may include receiving a concentration of one or more of chloride, saline, sulphone, sand, and dust.

The performing of the corrosion and erosion mitigation actions at 406 may include performing one or more of an inspection, replacement of one or more components of the aircraft engine, and engine wash.

Figure 5:
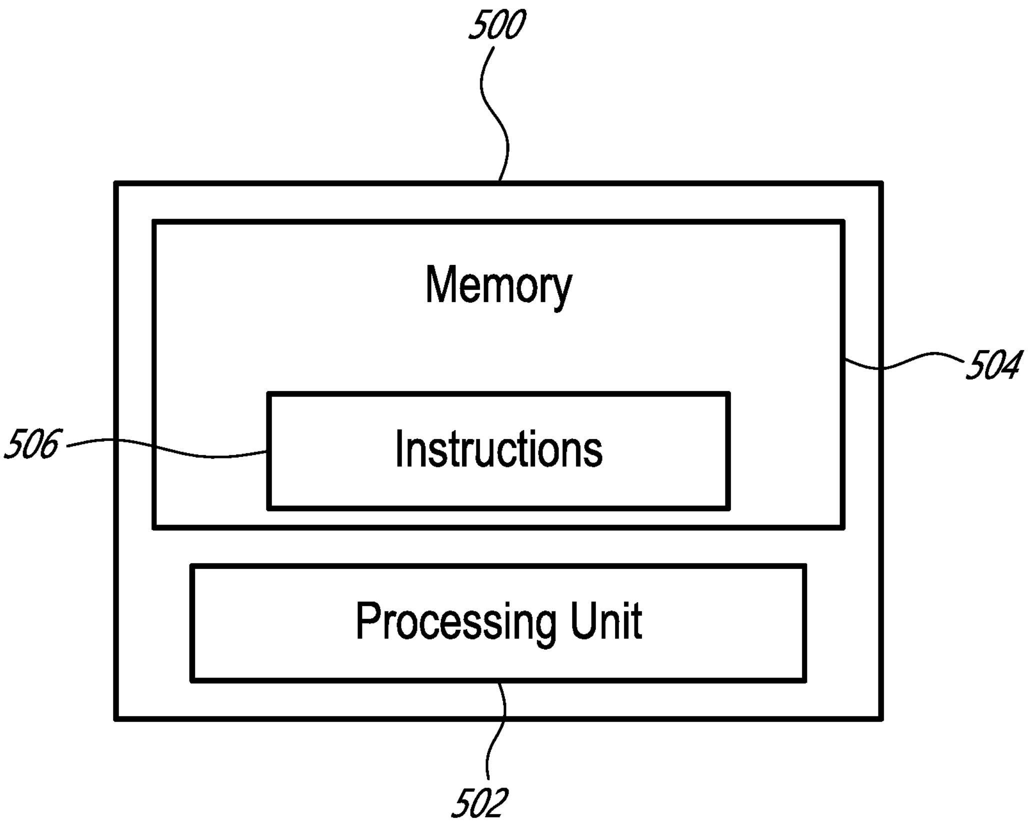
FIG. 5 is a schematic representation of a controller to be used with the aircraft engine of FIG. 1.

With reference to FIG. 5 an example of a computing device 500 is illustrated. For simplicity only one computing device 500 is shown but the system may include more computing devices 500 operable to exchange data. The computing devices 500 may be the same or different types of devices. The controller 34 may be implemented with one or more computing devices 500. Note that the controller 34 can be implemented as part of a full-authority digital engine controls (FADEC) or other similar device, including electronic engine control (EEC), engine control unit (ECU), electronic propeller control, propeller control unit, and the like. In some embodiments, the controller 34 is implemented as a Flight Data Acquisition Storage and Transmission system, such as a FAST™ system. The controller X may be implemented in part in the FAST™ system and in part in the EEC. Other embodiments may also apply.

The computing device 500 comprises a processing unit 502 and a memory 504 which has stored therein computer-executable instructions 506. The processing unit 502 may comprise any suitable devices configured to implement the method described herein such that instructions 506, when executed by the computing device 500 or other programmable apparatus, may cause the functions/acts/steps performed as part of the method as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems described herein may be implemented in a high level procedural or object oriented programming or scripting language, or a combination thereof, to communicate with or assist in the operation of a computer system, for example the computing device 500. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term “connected” or “coupled to” may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of mitigating corrosion and erosion in an aircraft engine, comprising:
- receiving a concentration of contaminants contained within a sample of an environmental medium ingested by the aircraft engine, including receiving the concentration of the contaminants contained within a container containing the sample, the container fluidly connectable to a drain port of the aircraft engine;
- determining a frequency of corrosion and erosion mitigation actions based on the concentration of the contaminants; and
- instructing a performance of the corrosion and erosion mitigation actions at the frequency.

2. The method of claim 1, wherein the receiving of the concentration of the contaminants includes receiving results of an analysis of the sample from a volume of the environmental medium collected after a given period of time of operation of the aircraft engine.

3. The method of claim 2, wherein the analysis comprises one or more of a spectroscopy analysis of the sample, a deposit analysis of the sample, and an exposition of the sample to strips configured to change color when a concentration of a given contaminants is about a given threshold.

4. The method of claim 1, wherein the receiving of the concentration of the contaminants includes receiving a concentration of soluble particles causing corrosion.

5. The method of claim 1, wherein the receiving of the concentration of the contaminants includes receiving a concentration of insoluble particles causing erosion.

6. The method of claim 1, wherein the receiving of the concentration of the contaminants includes receiving a concentration of one or more of chloride, saline, sulphone, sand, and dust.

7. The method of claim 1, wherein the determining of the frequency of the corrosion and erosion mitigation actions based on the concentration of the contaminants includes determining that the frequency of the corrosion and erosion mitigation actions is decreased compared to a baseline frequency of the corrosion and erosion mitigation actions.

8. The method of claim 1, wherein the determining of the frequency of the corrosion and erosion mitigation actions based on the concentration of the contaminants includes determining that the frequency of the corrosion and erosion mitigation actions is increased compared to a baseline frequency of the corrosion and erosion mitigation actions.

9. The method of claim 1, wherein the instructing of the performance of the corrosion and erosion mitigation actions at the frequency includes instructing the performance of one or more of an inspection, replacement of one or more components of the aircraft engine, and engine wash.

10. The method of claim 1, further comprising determining an exposure time of the aircraft engine to the environmental medium containing the contaminants.

11. The method of claim 10, wherein the determining of the exposure time includes determining the exposure time as a function of a volume of the environmental medium within a container connectable to a drain port of the aircraft engine and of a flow rate of the environmental medium at which the environmental medium flows into the container.

12. A method of mitigating corrosion and erosion in an aircraft engine, comprising:
- receiving a concentration of contaminants contained within a sample of an environmental medium ingested by the aircraft engine, including receiving results of an analysis of the sample from a volume of the environmental medium collected after a given period of time of operation of the aircraft engine, the analysis including one or more of a spectroscopy analysis of the sample, a deposit analysis of the sample, and an exposition of the sample to strips configured to change color when a concentration of a given contaminants is about a given threshold;
- determining a frequency of corrosion and erosion mitigation actions based on the concentration of the contaminants; and
- instructing a performance of the corrosion and erosion mitigation actions at the frequency.

13. The method of claim 12, wherein the receiving of the concentration of the contaminants includes receiving a concentration of one or more of soluble and insoluble particles causing corrosion.

14. The method of claim 12, wherein the receiving of the concentration of the contaminants includes receiving a concentration of one or more of chloride, saline, sulphone, sand, and dust.

15. The method of claim 12, wherein the determining of the frequency of the corrosion and erosion mitigration actions based on the concentration of the contaminants includes determining that the frequency of the corrosion and erosion mitigation actions is decreased or increased compared to a baseline frequency of the corrosion and erosion mitigation actions.

16. The method of claim 12, wherein the instructing of the performance of the corrosion and erosion mitigation actions at the frequency includes instructing the performance of one or more of an inspection, replacement of one or more components of the aircraft engine, and engine wash.

17. A method of mitigating corrosion and erosion in an aircraft engine, comprising:

receiving a concentration of contaminants contained within a sample of an environmental medium ingested by the aircraft engine;

determining an exposure time of the aircraft engine to the environmental medium containing the contaminants, including determining the exposure time as a function of a volume of the environmental medium within a container connectable to a drain port of the aircraft engine and of a flow rate of the environmental medium at which the environmental medium flows into the container;

determining a frequency of corrosion and erosion mitigration actions based on the concentration of the contaminants; and instructing a performance of the corrosion and erosion mitigation actions at the frequency.

18. The method of claim 17, wherein the receiving of the concentration of the contaminants includes receiving a concentration of one or more of soluble and insoluble particles causing corrosion.

19. The method of claim 17, wherein the determining of the frequency of the corrosion and erosion mitigation actions based on the concentration of the contaminants includes determining that the frequency of the corrosion and erosion mitigation actions is increased or decreased compared to a baseline frequency of the corrosion and erosion mitigation actions.

20. The method of claim 17, wherein the instructing of the performance of the corrosion and erosion mitigation actions at the frequency includes instructing the performance of one or more of an inspection, replacement of one or more components of the aircraft engine, and engine wash.

* * * * *